United States Patent [19]

Kaady et al.

[11] Patent Number: 5,367,736
[45] Date of Patent: Nov. 29, 1994

[54] ROTATING BRUSH FOR WASHING THE SIDES OF VEHICLES

[75] Inventors: Charles M. Kaady, Portland; Robert E. Bowman, Beaverton, both of Oreg.

[73] Assignee: Kaady Chemical Corp., San Leandro, Calif.

[21] Appl. No.: 184,213

[22] Filed: Jan. 21, 1994

[51] Int. Cl.⁵ .................................... B60S 3/06
[52] U.S. Cl. ........................... 15/53.3; 15/DIG. 2
[58] Field of Search .............. 15/53.2, 53.3, DIG. 2, 15/97.3

[56] References Cited

U.S. PATENT DOCUMENTS

| | | | |
|---|---|---|---|
| 3,747,151 | 7/1973 | Takeuchi | 15/53.2 |
| 3,772,724 | 11/1973 | Wilson | 15/53.3 |
| 4,354,291 | 10/1982 | Ennis | 15/53.3 |
| 4,513,467 | 4/1985 | Roncaglione | 15/53.3 |
| 4,754,515 | 7/1988 | Ennis et al. | 15/53.3 |

FOREIGN PATENT DOCUMENTS

| | | | |
|---|---|---|---|
| 1532722 | 6/1968 | France | 15/DIG. 2 |
| 0074754 | 4/1987 | Japan | 15/53.3 |

*Primary Examiner*—Edward L. Roberts
*Attorney, Agent, or Firm*—Klarquist Sparkman Campbell Leigh & Whinston

[57] ABSTRACT

A rotatable brushing apparatus for use in an automatic car wash is pivoted from a central support member which is substantially at the centerplane of the apparatus and above the path of a vehicle passing therebelow, the brush being rotated such that its motion at the surface of the vehicle is in the same direction as the motion of the vehicle.

3 Claims, 4 Drawing Sheets

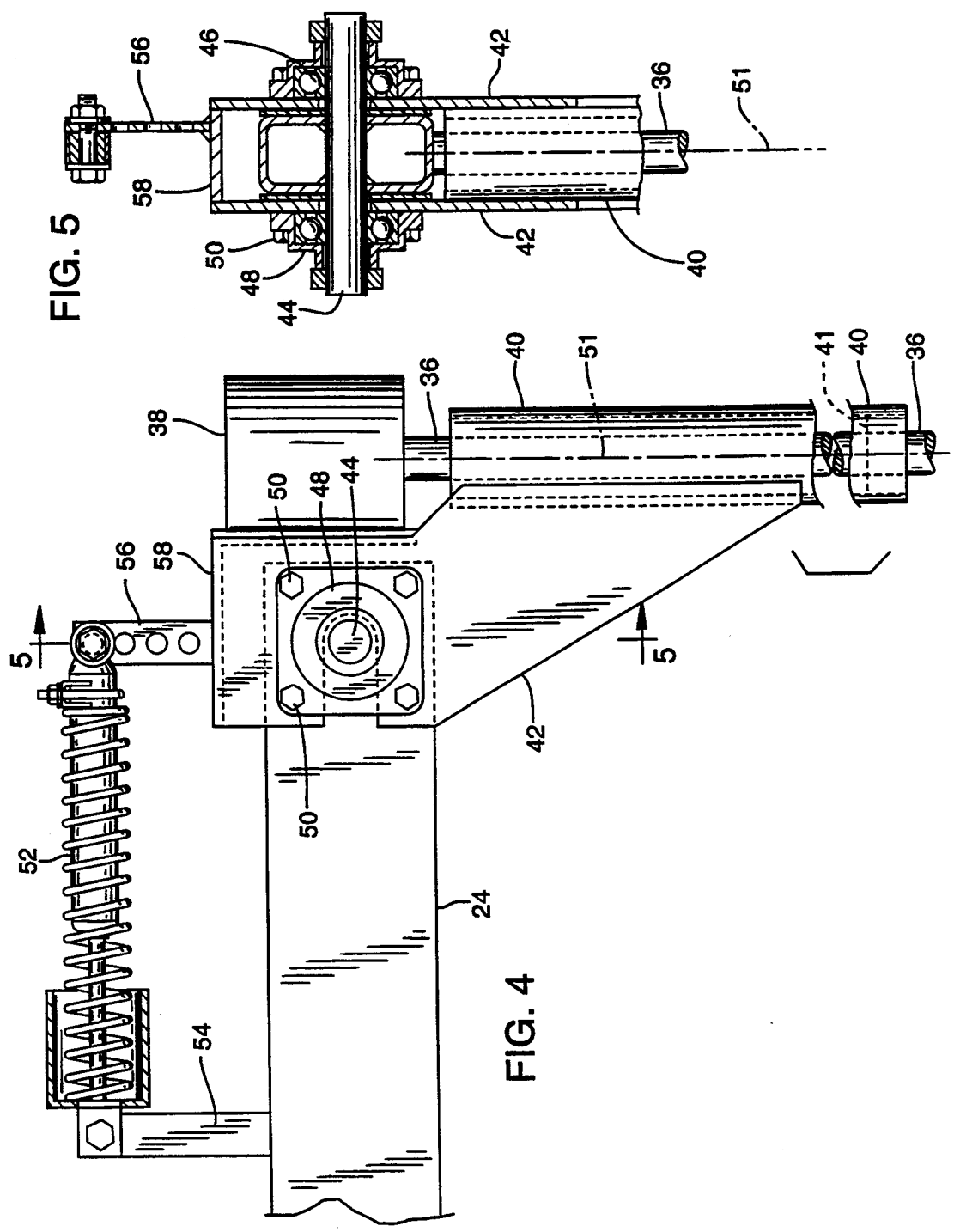

ROTATING BRUSH FOR WASHING THE SIDES OF VEHICLES

FIELD OF THE INVENTION

This invention relates to brushes for washing the sides of vehicles in automatic car washes and, more particularly, to such brushes wherein the path of the bristles adjacent the surface of the vehicle as the brush rotates is in the same direction as the path of the vehicle as it passes the brush.

BACKGROUND OF THE INVENTION

At least two rotating side brushes are required to wash the sides of a vehicle satisfactorily in an automatic car wash. Considering, for example, the left or driver's side of the vehicle, one of the brushes must turn clockwise (when looking down), such that the path of the bristles adjacent the surface of the vehicle is opposite to the direction of the vehicle as it passes the brush. The other brush must turn counter-clockwise (when looking down), such that the path of the bristles adjacent the surface of the vehicle is in the same direction as the path of the vehicle as it passes the brush. Typically, such rotating side brushes are mounted on arms which pivot at points located to the sides of the vehicle.

The clockwise-turning brush does not cause any problems—the fact that the path of the bristles is opposite to that of the path of the vehicle as it passes the brush compensates for the pressure exerted by the brush against the side of the vehicle and does not cause damage thereto. However, the counter-clockwise-turning brush, with its bristles moving in the same direction as the surface of the vehicle when in contact therewith, tends to exert undo pressure on the surface of the vehicle, thereby possibly to cause damage thereto. In the automatic car wash industry, it is said that such a brush tends to "suck" into the side of the vehicle, possibly to do damage to the fenders in the region of the wheel wells and other similarly configured parts.

In order to solve this problem, some car wash equipment manufacturers have tied the two brushes together, for example, by a tie rod. Such a tie rod prevents the counter-clockwise-turning brush from exerting excessive pressure against the side of the vehicle. It is disadvantageous, however, to link car washing brushes together.

Accordingly, it is the principal object of the present invention to provide a rotatable brushing apparatus for washing the generally vertical surfaces of a moving vehicle in an automatic car wash, wherein the direction of motion of the bristles of the brush at the surface of the vehicle is in the same direction as the motion of the vehicle as it passes the brush, and which brush will not damage the vehicle.

It is a further object of the present invention to provide a brush of the aforementioned type that can operate completely independently of any other brushing apparatus in the car wash.

It is a still further object of the present invention to provide such a brushing apparatus that requires no controls other than a biasing spring or a counterweight to urge it into contact with the sides of the vehicle.

SUMMARY OF THE INVENTION

The rotating brush of the present invention comprises a frame for supporting the brushing assembly and a generally horizontally disposed support arm, one end of the arm being pivotally mounted on the frame at a point located above the top of the vehicle and substantially at the center plane of the frame. A generally vertically disposed shaft is mounted adjacent the other end of the support arm by pivot means, the position of which is offset from the centerline of the shaft, whereby the shaft is normally urged by gravity toward the end of the support arm that is mounted on the frame. A rotatable brush is mounted on the shaft, and motor means are mounted on the shaft for rotating the brush such that the motion of the brush at the surface of the vehicle is in the same direction as the motion of the vehicle.

The rotatable brushing apparatus of this invention does not damage a vehicle as it is being washed. It is operable completely independently of any other brushing apparatus and, particularly, it is operable completely independently of any other side brushing apparatus wherein the motion of the bristles at the surface of the vehicle in the other side brushing apparatus is in a direction opposite to that of the motion of the vehicle as it passes the brush.

BRIEF DESCRIPTION OF THE DRAWINGS

FIG. 4 is a view to an enlarged scale illustrating the connection of the horizontally disposed support arm to the generally vertically disposed shaft on which the rotatable brush is mounted; and FIG. 5 is a cross sectional view taken on line 5—5 of FIG. 4.

DESCRIPTION OF THE PREFERRED EMBODIMENT

Figure 1:
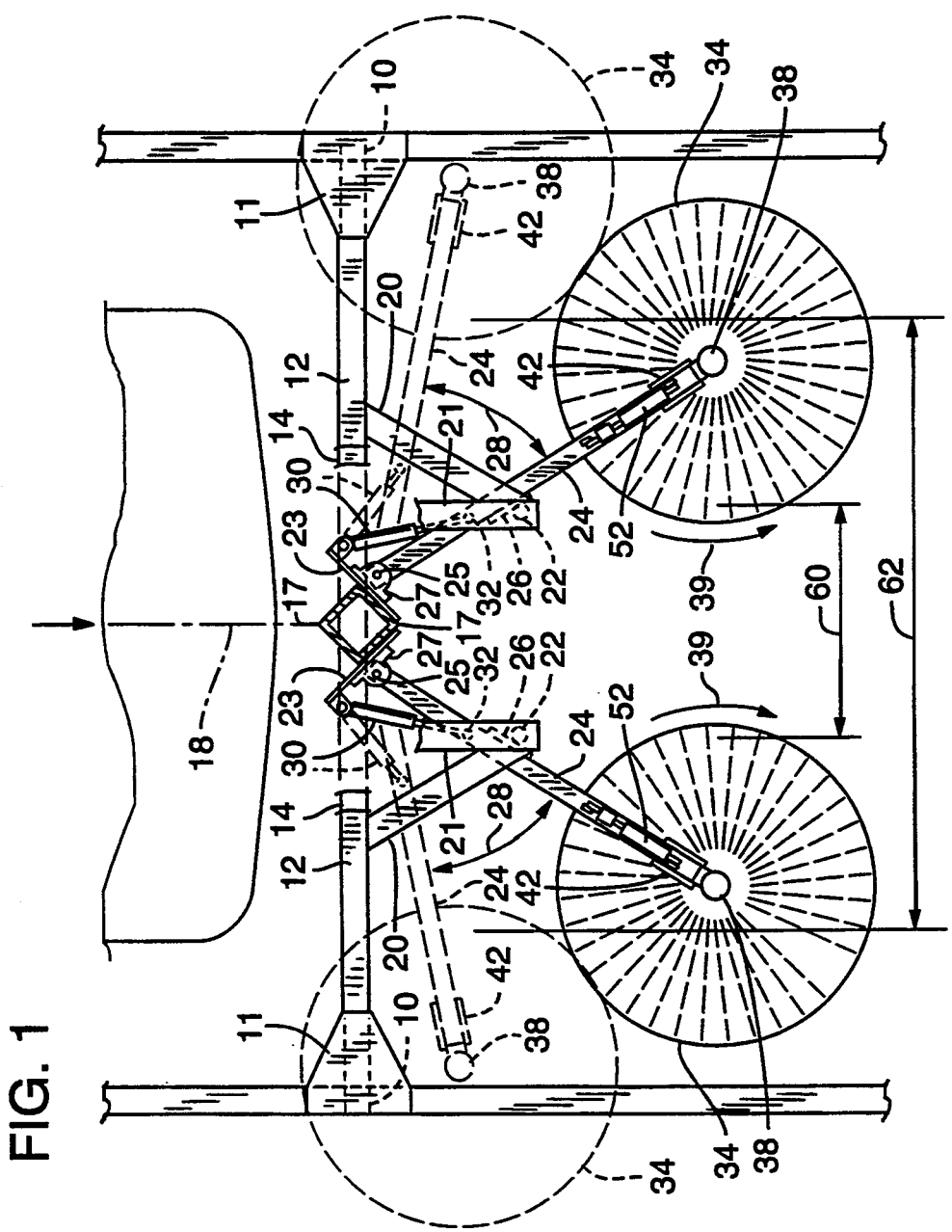
FIG. 1 is a top view of a pair of rotatable brushing apparatuses made according to my invention, each of the pair being adapted to wash one side of a vehicle as it passes underneath a frame from which the brushes depend, the solid line portions of the drawing illustrating the position of the apparatus when not in contact with the sides of the vehicle, and the dashed line portions of the drawing illustrating the positions of the brushes at their maximum extended positions when in contact with the sides of a vehicle, FIG. 1 being taken generally on line 1—1 of FIG. 2.
Figure 2:
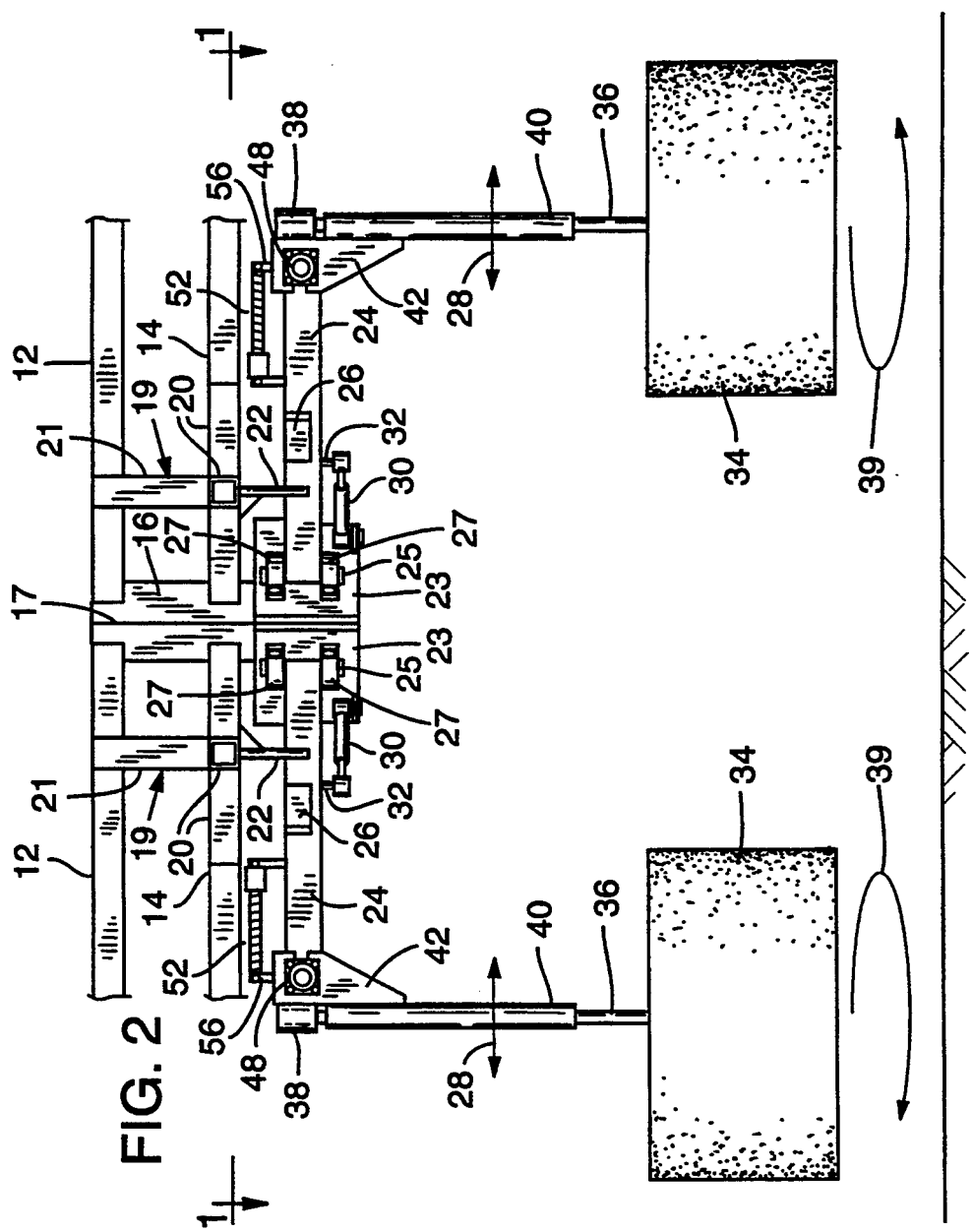
FIG. 2 is a front elevational view of the pair of rotatable brushing apparatuses of FIG. 1, the view being taken from a point in front of the vehicle passing therethrough.
Figure 3:
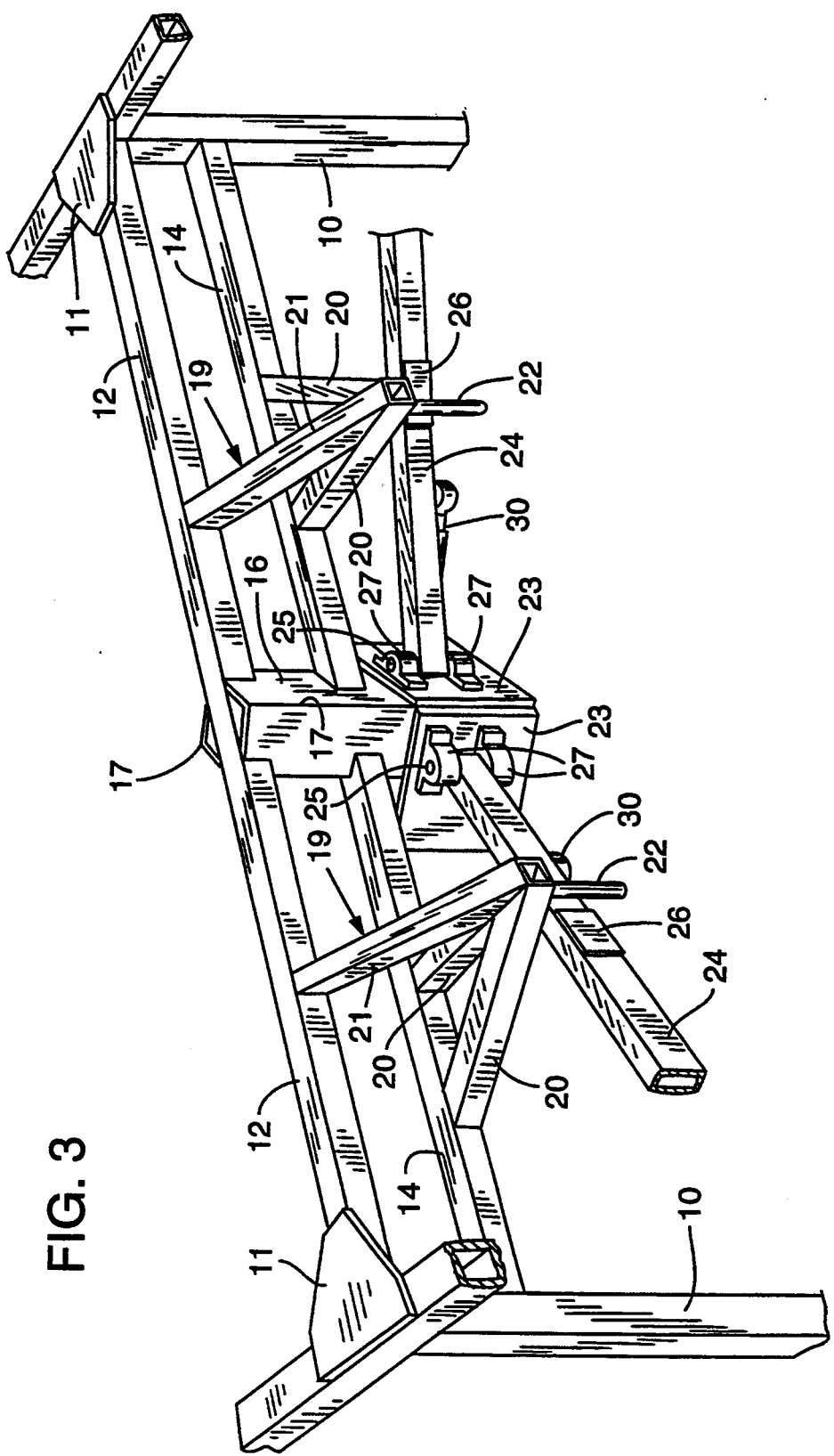
FIG. 3 is a perspective view of the frame which supports the brushing assembly.

Referring to the drawings and particularly to FIGS. 1, 2 and 3, the car washing apparatus of this invention comprises a frame made of a pair of vertical steel support posts 10 to which are attached by end plates 11 a pair of upper horizontal members 12 and a second pair of vertically separated horizontal members 14, which members 12, 14 support at their inner ends a vertical box beam 16 oriented such that its opposed vertical corners 17 lie on the center plane 18 of the frame. Forwardly extending trusses 19 each formed of horizontal members 20 and a downwardly depending diagonal member 21 are supported by horizontal members 12, 14 and, in turn, support depending stop pins 22 (see FIG. 3) for a purpose to be hereinafter described.

A support plate 23 is welded to each of the vertical front faces of box beam 16. A pair of bearings 27 are fastened to the front face of each support plate 23 and a horizontal support arm 24 is pivotally mounted on a pivot pin 25 carried by bearings 27. Each horizontal arm 24 carries a rubber stop pad 26 which is adapted to abut against the respective stop pins 22, each stop pad 26 and pin 22 defining the inner limit of motion of arms 24 as indicated by arrows 28, the positions of arms 24 when at their inner limits being shown in solid lines in FIG. 1 and in dashed lines when at their outer limits. A spring-loaded shock absorber 30, pivotally mounted on each support plate 23 and pivotally attached to a respective horizontal arm 24 at points 32 (see FIG. 2), urges such arm into the inner limiting position.

It will be noted that the positions of the pivotally hinging bearings 27 (pivot pins 25) of each of the horizontal arms 24 are substantially at the center plane 18 of the frame and of the vehicle being washed, and are also positioned above the top of the vehicle. Positioning the pivot points of the horizontal arms in this manner has been unexpectedly found to solve the "sucking" problem previously described.

A rotatable brush 34 mounted on a generally vertically disposed shaft 36 is powered by a motor 38 mounted on the shaft. See FIGS. 2 and 4. Each motor 38 rotates its respective brush 34 in the directions shown by arrows 39. See FIGS. 1 and 2. Each shaft 36 is received in a sleeve 40 and is supported by a bearing 41. Each sleeve 40 is welded to a pair of brackets 42 pivotally attached to each arm 24 on a pivot pin 44 received in a pair of ball bearings 46, each bearing 46 being received in a cap 48 attached to brackets 42 by bolts 50. See FIGS. 4 and 5. Each pivot pin 44 which mounts a shaft 36 is itself positioned adjacent the exterior end of the respective support arm 24, but at a position interiorly offset from the centerline 51 of shaft 36. By this means, each shaft 36 and brush 34 is caused normally to hang tilted slightly inwardly, that is, the brush 34 and shaft 36 are normally urged by gravity toward the interiorly pivoted end of each horizontal arm 24. Such vertically offset mountings urge each brush 34 into contact with a side of the vehicle. Each motor 38 rotates its respective brush 34 in the directions shown by arrows 39 such that the motions of the bristles of the brushes at the respective side surfaces of the vehicle are each in the direction of motion of the vehicle as it passes through the apparatus.

For each brush 34 and shaft 36 there is a second spring-loaded shock absorber 52 mounted on arms 54, 56, which are themselves mounted respectively on arms 24 and on a plate 58 joining brackets 42. Each shock absorber 52 pivots brackets 42, sleeve 40 and shaft 36 about the respective pivot pin 44, thus to urge the lower end of shaft 36 and the attached brush 34 toward the inner end of arm 24, thus augmenting the normal tendency of brush 34 and shaft 36 to tilt toward such inner end. By these means brushes 34 are urged into contact with the sides of the vehicle as it passes therebetween. (When the brushes 34 are urged to their innermost positions by the actions of the shock absorbers 30 and 52 (arrow 60 in FIG. 1), they are about thirty inches apart. When in their widest positions (arrow 62 in FIG. 1), they are about sixty-eight inches apart.)

It is thus seen that the brushing apparatus of this invention requires no controls other than the spring-loaded shock absorbers 30 and 52 in order to maintain operational contact with the sides of the vehicle. An adequate range of motion is provided. The unit does not have to be connected to any other side washing brush. Its suspension as described permits it to operate most efficiently without risk of damage to any vehicle.

We claim:

1. A rotatable brushing apparatus for washing the generally vertical surfaces of a moving vehicle in an automatic wash, comprising:

a generally symmetrical frame for supporting a brushing assembly, the frame having a longitudinal centerplane extending in the direction of motion of the moving vehicle;

a generally horizontally disposed support arm, one end of the support arm being pivotally mounted on the frame at a point located above the top of the vehicle and substantially in the centerplane of the frame;

a generally vertically disposed shaft;

a bracket attached to the shaft at its upper end, the bracket extending parallel to the direction of the support arm and toward the centerplane of the frame;

pivot means attached to the support arm adjacent its other end, the pivot means having a horizontal axis, the axis being perpendicular to the longitudinal centerline of the support arm, the pivot means being attached to the bracket at a point interiorly offset from the centerline of the shaft, whereby the lower end of the shaft is normally urged by gravity toward the one end of the support arm;

first spring means attached at one end to the horizontally disposed support arm and at the other end to the frame and adapted to urge the other end of the support arm to pivot toward the center plane of the frame;

a brush mounted on the shaft; and motor means mounted on the shaft for rotating the brush such that the motion of the brush at the surface of the vehicle is in the same direction as the motion of the vehicle.

2. A rotatable brushing apparatus as in claim 1, further comprising second spring means connected at one end to the bracket and at the other end to the support arm and adapted further to urge the lower end of the shaft toward the one end of the support arm.

3. A rotatable brushing apparatus for washing the generally vertical side surfaces of a moving vehicle traversing along a defined horizontal path, the apparatus comprising:

a pair of vertical support members, each of said vertical support members being positioned at one side of the defined horizontal path;

at least one pair of horizontal support members supported by said pair of vertical support members, said pair of horizontal support members and said pair of vertical support members defining an archway above said defined horizontal path, said archway having a longitudinal centerplane, said vehicle traversing along said defined horizontal path beneath and through said archway;

a central support member disposed in the centerplane of said archway and above said vehicle when said vehicle is traversing along said defined horizontal path beneath and through said archway, said central support member being supported by said pair of horizontal support members;

a pair of horizontally disposed brush supporting arms, one end of each of said pair being pivotally mounted on opposed sides of said central support member, said pair of horizontally disposed brush supporting arms being adapted to pivot above said vehicle as said vehicle is traversing along said defined horizontal path beneath and through said archway;

a pair of generally vertically disposed shafts; a bracket attached to each of the shafts at their upper ends, the brackets extending parallel to the direction of the supporting arms, and toward the centerplane of the archway;

pivot means attached to each of the horizontally disposed brush supporting arms adjacent their other ends, each of the pivot means having a horizontal axis, each of the axes being perpendicular to the longitudinal centerlines of the respective horizontally disposed brush supporting arms, each of the pivot means being attached to the respective brackets at points interiorly offset from the centerlines of the respective shafts, whereby the lower ends of the shafts are normally urged by gravity toward said one ends of said horizontally disposed brush supporting arms;

a brush mounted on the lower end of each of said shafts;

motor means mounted on each of said shafts for rotating the brushes such that their respective motions at the side surfaces of the vehicle are each in the direction of the vehicle as it is traversing along the defined horizontal path;

a frame supported by each of said pair of horizontal support members;

a pin depending from each of said frames; and a pair of spring means one each attached to each of said pair of horizontally disposed brush supporting arms and to said opposed sides of said central support member, said spring means being adapted to urge the other ends of the respective horizontally disposed brush supporting arms toward said centerplane of said archway, said depending pins defining the limits of inward motion of said horizontally disposed brush supporting means.

* * * * *